United States Patent [19]

Bernosky

[11] Patent Number: 4,958,796
[45] Date of Patent: Sep. 25, 1990

[54] COUPLING OR CONNECTOR FOR SECURING A LOAD-BEARING SUPPORT TO A HEAD OF A BOLT

[76] Inventor: John Bernosky, Rte. 1, Box 247A, Mt. Morris, Pa. 15349

[21] Appl. No.: 420,312

[22] Filed: Oct. 12, 1989

[51] Int. Cl.$^5$ .............................................. F16L 3/00
[52] U.S. Cl. ...................... 248/317; 248/58; 405/259; 411/374; 411/383; 411/400
[58] Field of Search .............. 248/317, 58, 62, 59; 405/259, 260, 261; 403/362, 320; 411/400, 401, 383, 396, 373, 374, 429

[56] References Cited

U.S. PATENT DOCUMENTS

| | | | |
|---|---|---|---|
| 680,609 | 8/1901 | Marquardt | 411/401 X |
| 1,098,250 | 5/1914 | Gonia | 248/58 |
| 1,120,411 | 12/1914 | Rohmer | 405/259 X |
| 1,937,654 | 12/1933 | Hamilton | 248/59 |
| 2,942,819 | 6/1960 | Brogan | 248/58 |
| 3,170,664 | 2/1965 | Carner | 248/317 X |
| 3,436,047 | 4/1969 | Foltz | 248/317 |
| 3,506,227 | 4/1970 | Jenkins | 248/59 |
| 3,559,910 | 2/1971 | Babb | 248/59 |
| 4,240,602 | 12/1980 | McDonald | 248/317 X |
| 4,638,965 | 1/1987 | De Bruine et al. | 248/59 |

*Primary Examiner*—David M. Purol
*Attorney, Agent, or Firm*—Melvin L. Crane

[57] ABSTRACT

This invention is directed to a coupling or a connector for securing a load-bearing support to a head of a bolt, particularly in a mining operation in which roof bolts have been used for shoring the roof of the mine. The coupling or connector is secured to a bolt head by which machinery may be lifted and or moved. A bolt may be secured in a wall to which the coupling or connector could be secured to the head for moving machinery from one place to another.

17 Claims, 3 Drawing Sheets

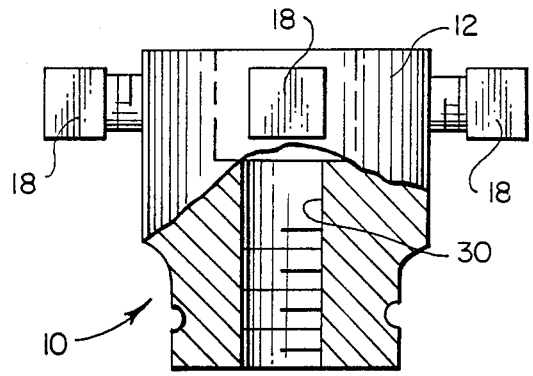
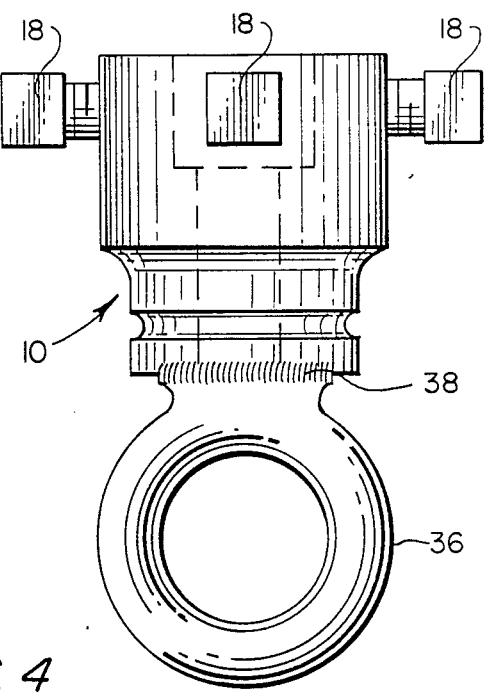
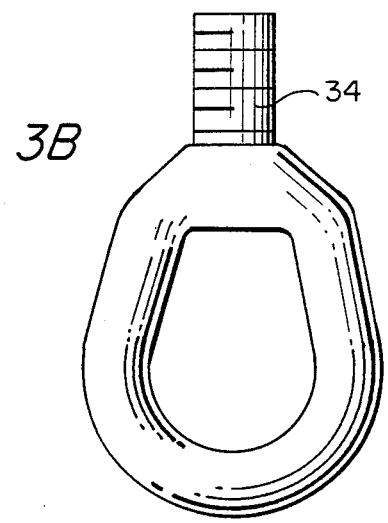
FIG. 4
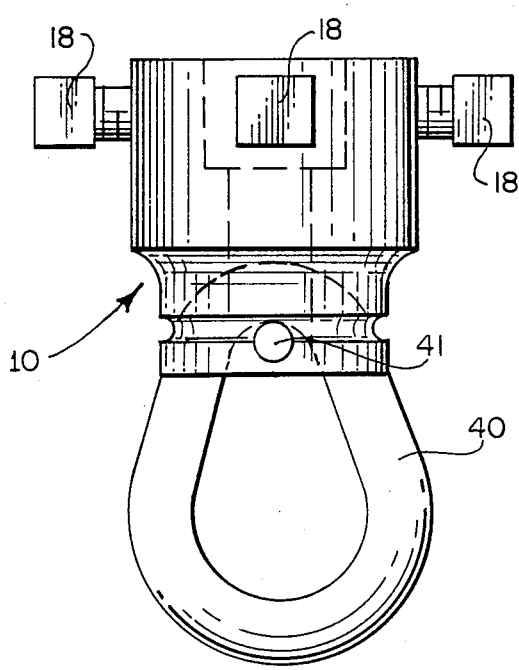
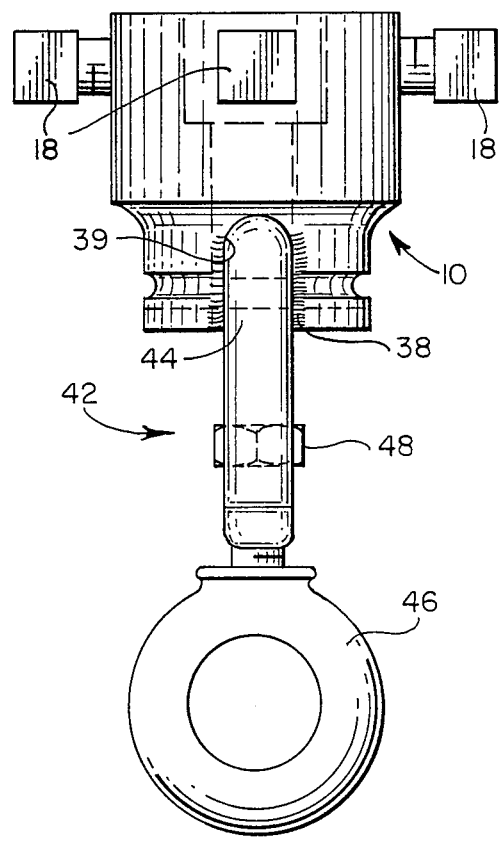
FIG. 5
FIG. 6

COUPLING OR CONNECTOR FOR SECURING A LOAD-BEARING SUPPORT TO A HEAD OF A BOLT

BACKGROUND OF THE INVENTION

This invention relates to load-bearing supports and couplings and more particularly to a load-bearing support and coupling for use in a coal mining operation for lifting heavy motor or machinery during repairs or for moving the same within the mine while making use of a well known roof bolt or similar support for the load-bearing support and coupling.

Heretofore, roof bolts have been used as a support for light-weight devices such as electrical cables, conduits, pipes and the like. Applicant has knowledge of the following U.S. Pat. Nos. 2,851,239; 2,854,824; 2,862,368; 2,891,752; 2,923,508; 3,785,598; 4,255,070; 4,293,243; and 4,334,803. These patents are seen to be directed to different means for supporting something from a roof bolt that is used in a mine for supporting the roof. Each of these support means are directed to light weight loads and are all used as an overhead support.

It is, therefore, an object of the invention to provide a load-bearing support and coupling which can be secured to the head of a roof bolt or similar bolt support for lifting and/or moving heavy loads of up to 1,000 lbs. or greater.

Another object is to provide a load-bearing support and coupling which is easily secured to and removed from the head of a supporting roof bolt.

Still another object is to provide a loading-bearing support and coupling which is easily secured to and removed from the head of a supporting roof bolt without damage to the roof bolt head.

Yet another object is to provide a load-bearing support and coupling which is easily manufactured and may be used by unskilled as well as skilled personnel and without any difficultly.

Other objects and advantages will become obvious from the drawings and description.

BRIEF DESCRIPTION OF THE DRAWINGS

FIG. 3B illustrates the lifting eye of FIG. 3A separated from the base or body;

FIG. 4 illustrates a pad-eye welded to a base or body such as shown in FIG. 1;

FIG. 5 illustrates a weldless link sling inserted into slots and secured by a through bolt to the base;

FIG. 6 illustrates a swivel with one end inserted into slots and secured to the base or body by welding;

DETAILED DESCRIPTION

Figure 1:
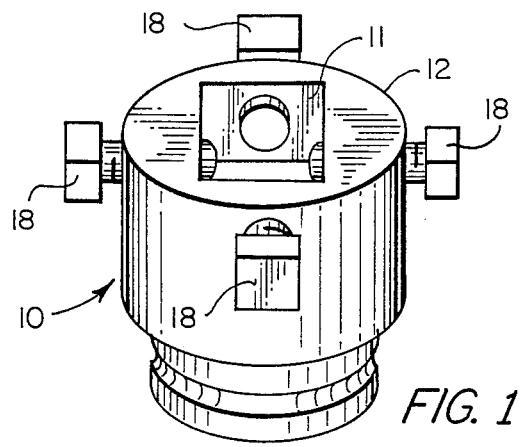
FIG. 1 illustrates a connector or body element of the load bearing support and coupling.
Figure 2A:
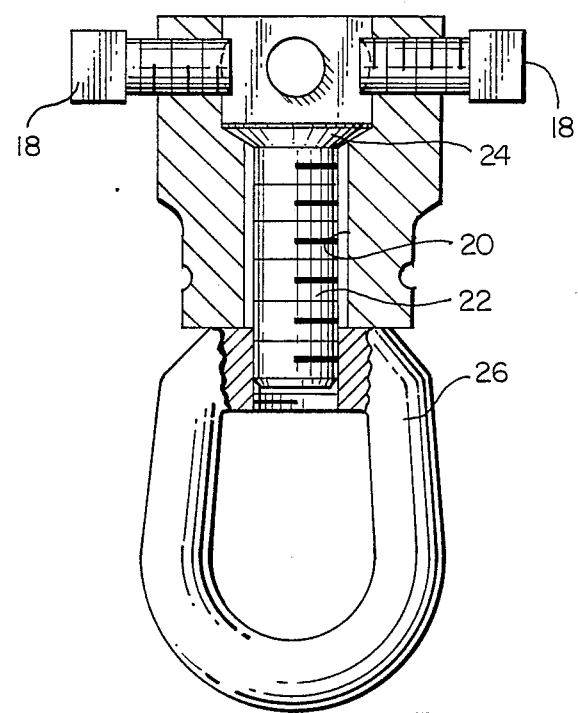
FIG. 2A is a cross sectional view of the connector base or body of FIG. 1 with an eye-nut secured thereto by a bolt.
Figure 2B:
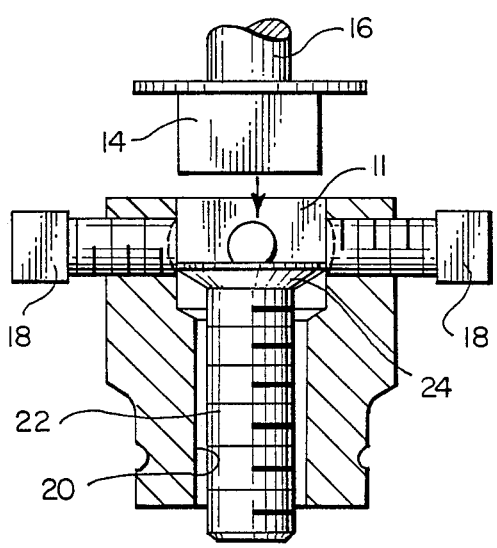
FIG. 2B is a cross sectional view of the base or body of FIG. 2 with the eye-nut separated from the bolt.
Figure 2B:
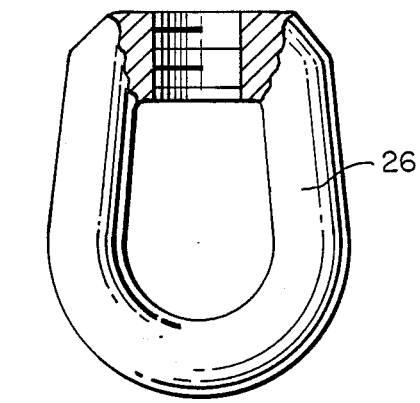

Now referring to the drawings which show different types of load-bearing supports secured to a coupling or connector base for lifting or moving heavy equipment, such as used in a coal mine, FIG. 1 illustrates a coupling or connector base 10 which is configured with a square opening 11 in one end 12 thereof, and the square opening 11 is adapted to slip-over and be rigidly secured to the head 14 of a roof bolt 16, shown in FIG. 2B, for lifting heavy loads such as a motor or other equipment used in a coal mine (not shown). The coupling 10 is rigidly secured to the head 14 of the roof bolt 16 by use of two pairs of oppositely disposed threaded bolts 18 which are each provided with a cupped end so that the cupped end of the bolt will dig into the head of the roof bolt to assure that the coupling does not pull off the head of the bolt.

Figure 9:
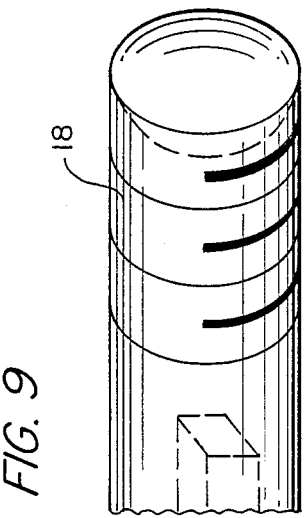
FIG. 9 illustrates an enlarged view of a cupped allen head set screw.

The threaded bolts 18 may be replaced by allen set screws with cupped ends as shown in FIG. 9. In rigidly securing connector base 10 to the head 14 of bolt 16, regular square headed bolts as shown in the drawings, allen head set screws, or a combinatin of each may be used. It has been found that in close spaces that allen head type screws must be used because there is insufficient room for a wrench to turn the square headed bolt. It has been determined that the diameter of the bolts may be from about ⅜ inch to about ⅝ inch. Allen head screws should have a diameter of from about ½ inch to about ⅝ inch.

In the event a separate or special roof bolt is used, the head of the special roof bolt may include indentations therein to receive the cupped ends of the bolts. The coupling or connector base 10 is shown with a passage 20 extending from the opening 11 to the bottom of the coupling. The passage may be formed without threads and a threaded bolt 22 with a head 24 thereon is seated in the bottom of the square opening 11 with the end of the bolt extending from the bottom of the coupling and being threaded into the threads of an eye nut 26. The eye nut 26 is threaded onto the bolt 22 and the eye nut is tightened against the bottom end of the coupling. The bolt 22 and eye nut 26 form the load-bearing support of the combined coupling-support and the coupling-support is rigidly secured, as will be hereinafter discussed, to the head of a roof bolt or to the head of any other bolt fixed in the roof of the mine. A bolt could also be secured in any other location in a mine such as in a side wall or rib and used for securing a come-along or similar device for moving equipment in either a horizontal or vertical direction.

Figure 3A:
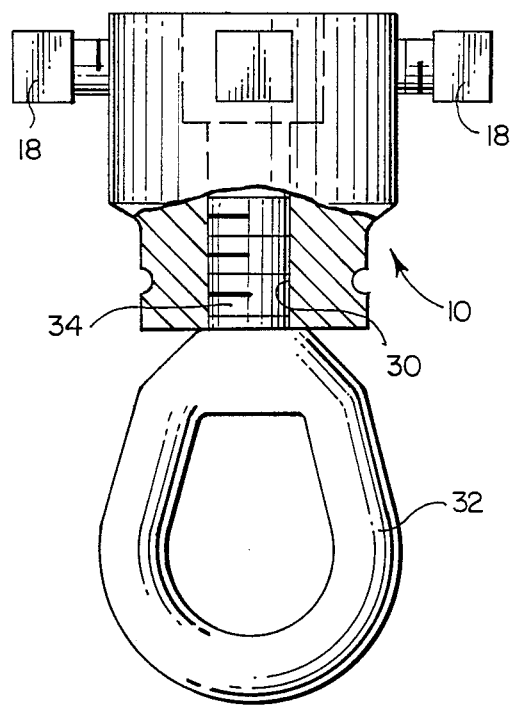
FIG. 3A illustrates a cross sectional view of the base or body with a threaded lifting eye threaded onto the base or body.

FIGS. 3A and 3B illustrate a coupling or connector base 10 which is substantially the same as shown in FIG. 1 to which a stud and threaded eye 32 is secured in a threaded passage 30 in the base 10. The threaded eye 32 includes a threaded stud 34 shown more clearly in FIG. 3B. FIG. 3B illustrates the coupling or connector base 10 and the threaded eye 32 is shown spaced from the coupling or connector base. In this modification of FIGS. 3A and 3B, the threaded eye becomes the load bearing support as best shown in FIG. 3A.

FIG. 4 illustrates a coupling or connector base 10 in which a pad eye 36 has been welded at 38 to the bottom end of the base. In this modification, the pad eye 38 becomes the load bearing support.

FIG. 5 illustrates a modification in which a sling link 40 is secured with one end inserted into end slots 39 (see FIG. 6, only one slot shown) in the bottom end of the coupling base 10 and supported by a bolt 41. The sling link 40 then becomes the load-bearing support.

FIG. 6 illustrates a modification in which a swivel 42 is secured at one end 44 in end slots 39 (only one slot shown) of the coupling base 10 as by welding. The swivel includes upper and lower eye pieces 44, 46 which are secured together by a stud secured to the lower eye that passes through the upper eye and is secured by a nut 48.

Figure 7:
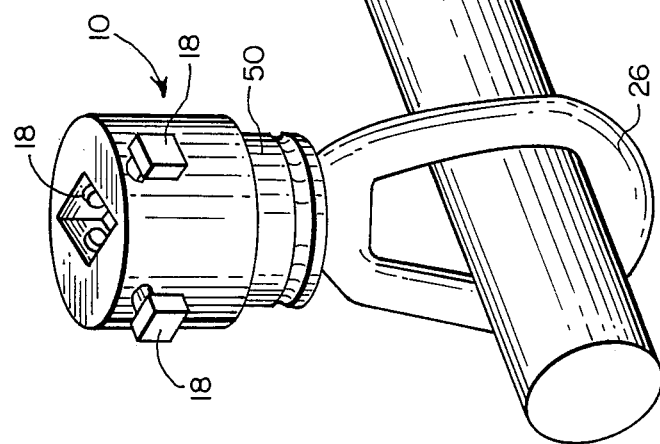
FIG. 7 illustrates the base or body of FIG. 1 with a bolt type anchor shackle secured to the lower end thereof.
Figure 7:
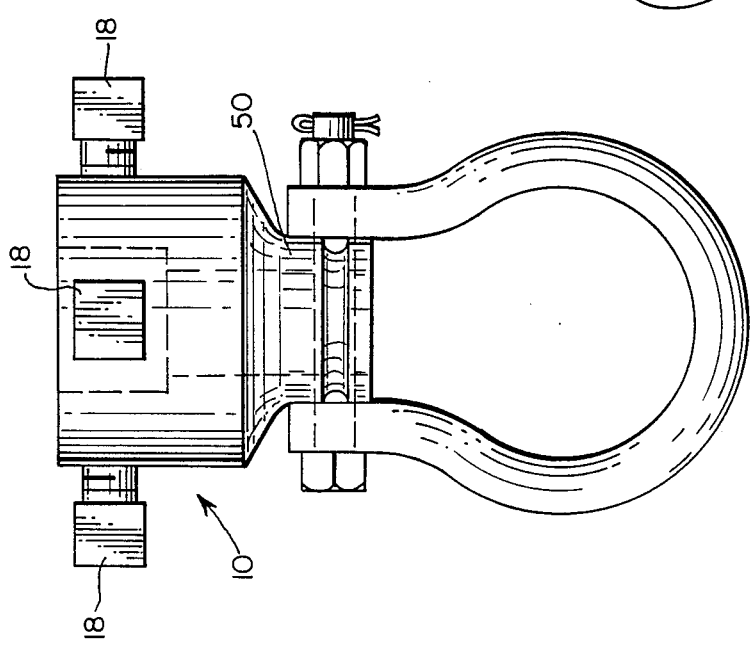

FIG. 7 is another modification in which a clevis is secured to the bottom portion 50 of the coupling 10 by placing oppositely disposed holes perpendicular to the central passage through which holes the clevis bolt passes. The clevis is shown secured to the bottom with ends thereof on opposite sides of the bottom portion 50. For light loads, a smaller clevis could be used which is suspended by only one hole in the bottom portion of the base.

Figure 8:
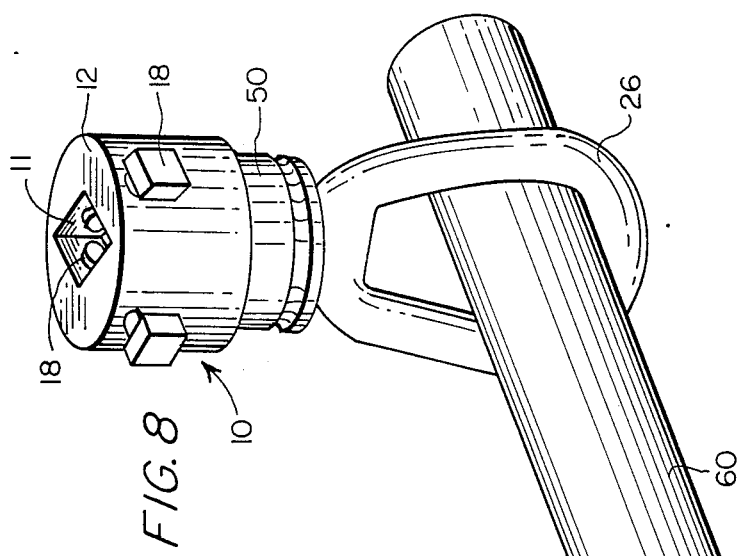
FIG. 8 illustrates two coupling-supports spaced from each other with a support rod supported thereby for lifting loads by the rod.

FIG. 8 illustrates the use of two coupling-supports 10 spaced from each other and which support a rod 60 between the load-bearing supports. By this arrangement, a load may be lifted any place along the rod and if desired moved along the rod to a new position. The rod may be used for situations where a single coupling-support cannot be placed substantially over head of the machinery or other load to be lifted.

The coupling-support need not be secured to a roof bolt head overhead. A bolt may be secured in a side wall or rib of a coal mine and the coupling-support secured to the head of the side wall bolt in order to move equipment from one place to another by use of a come-along, a block-and-tackle, or any other type of moving device. Moreover, it will be readily apparent that the coupling-support may be used in any environment other than a coal mine by securing the coupling to the head of a bolt which may be positioned in any suitable place for lifting and/or moving heavy loads.

The coupling or connector base is preferably formed of hardened steel, and a hardness of 30 ROCKWELL has been found to be suitable in use. It is well known that the head of a roof bolt for a mine is 1⅜ inch square; therefore, the upper end 12 of the base in this instance has a diameter of about 2⅛ inches with the opening 11 therein centered on the linear axis with the opening 11 in the top portion 12 forming a square with a side dimensions of approximately 1¼ inches and with a depth of about ⅞ inch. The bottom of the opening 11 is beveled around the passage 20 so that a beveled head bolt may seat in the bevel. The bottom portion of base 10 has a diameter of approxmimately 1¾ inches and is thus beveled or reduced in diameter. The beveled or reduced diameter portion accomodates the load-bearing supports some of which are welded to the reduced diameter portion. The passage 20 is sufficiently large to accomodate at least a ⅞ inch bolt.

The bolts 18 or allen head set screws are grade #5 hardened or of a higher hardness and have cupped ends as explained above. The hardened steel bolts or allen head set screws are sufficiently strong to dig into the head of the roof belt and to bear a load of up to 1,000 lbs. or greater.

The coupling or connector base 10 has been shown with a larger diameter upper end portion than the diameter of the bottom end portion. Such a configuration saves material and reduces the final cost of the coupler base. It will be obvious that the configuration could be square, a cylinder or any other desired shape. It will also, be obvious that the length or other overall dimensions of connection base 10 could be selectively varied depending upon its environmental application or use. The important aspect is that the coupler or connector be constructed and configured so that it can be rigidly secured to the head of a bolt. The securing bolts or allen screws should be positioned near the upper end of the coupler base so that the cupped ends of the bolts or screws will contact the sides of the bolt head at approximately the geometric center of each side of the head.

While several load bearing supports have been shown, obviously other configurations of load bearing supports may be used in combinatin with the connector base. The diameter and size of the opening 11 in the connector will depend on the size of the bolt head to which it is to be secured. For light loads, the size could be smaller than shown or described above. The opening in the coupler should be just larger than the bolt head for a close fit so that less side-to-side pressure will be exerted on the bolts or allen head screws that secure the coupler base to the bolt head.

The coupling or connector body has been shown with a through passage 20 that extends from the bottom of the square opening 11 to the bottom end. It will be obvious that for the modification shown in FIGS. 3A and 3B that the passage 20 in the body can be threaded from the bottom toward the opening 11 so that sufficient threads are provided to secure the shank of the threaded eye to the body. For the modifications shown in FIGS. 4–7, there need not be a passage 20 in the body. Only the bottom portion of the body need be structured so that the load bearing supports may be secured to the bottom portion.

Obviously, a passage 20 along the axis of connector base 10 would permit any gases to escape during welding of the load bearing supports to the bottom of the body. Another reason for having a threaded axial passage through the body would be so that the coupler body could be used with any desired load bearing support without any special features regarding the body.

I claim:

1. A coupler or connector body for heavy load-bearing supports which comprises:
   a body having an upper portion and a lower portion,
   an axially aligned opening in said upper portion of said body having a size compatible with a bolt head to which said coupler is to be secured, and
   at least one pair of oppositely disposed radially directed threaded bolts or screws that pass through radially directed threaded holes in said upper portion of said body to said axially aligned opening therein to secure said coupler to said bolt head.

2. A coupler or connector body as set forth in claim 1, in which:
   said coupler includes two pair of oppositely disposed threaded bolts or screws that pass through threaded holes in said upper portion of said body to said axially aligned opening therein.

3. A coupler or connector body as set forth in claim 2, wherein said axially aligned opening of said upper portion of said body is square and said body includes an axial aperture in said lower portion of said body that extends from a bottom of said square opening in said upper portion of said body to a bottom end of said lower portion of said body.

4. A coupler or connector body as set forth in claim 3, in which said axial aperture in said lower portion of said body is threaded.

5. A coupler or connector body as set forth in claim 4, which includes:
a threaded bolt that passes through said axial aperture in said lower portion of said body,
an eye-nut secured to said bolt and drawn tightly against said bottom end of said lower portion of said body to provide a load-bearing support.

6. A coupler or connector body as set forth in claim 5, in which:
said bottom of said square opening in said upper portion is beveled toward said axial aperture in said lower portion of said body, and
said bolt that passes through said axial aperture in said lower portion of said body has a beveled head toward said beveled bottom of said square opening in said upper portion of said body to provide a load-bearing support.

7. A coupler or connector body as set forth in claim 4, which includes:
an eye with a threaded shank, and
said threaded shank is threaded into said threaded axial aperture in said lower portion of said body to tighten said eye against a bottom end of said lower portion of said body to provide a load-bearing support.

8. A coupler or connector body as set forth in claim 1, which includes:
an eye welded to a bottom end of said bottom portion of said body that provides a load-bearing support.

9. A coupler or connector body as set forth in claim 2, which includes:
a pad eye welded to a bottom end of said bottom portion of said body that provides a load-bearing support.

10. A coupler or connector body as set forth in claim 1, which includes:
a sling link welded at one end thereof to a bottom end of said bottom portion of said body.

11. A coupler or connector body as set forth in claim 2, which includes:
a sling link welded at one end thereof to a bottom end of said bottom portion of said body.

12. A coupler or connector body as set forth in claim 1, which includes:
a swivel in which one end of said swivel is welded to a bottom end of said bottom portion.

13. A coupler or connector body as set forth in claim 2, which includes:
a swivel in which one end of said swivel is welded to a bottom end of said bottom portion.

14. A coupler or connector body as set forth in claim 1, in which:
said bottom portion of said body includes oppositely disposed holes perpendicular to an axis of said body, and
a shackle secured to said bottom portion by a bolt that passes through said oppositely disposed holes.

15. A coupler or connector body as set forth in claim 2, in which:
said bottom portion of said body includes oppositely disposed holes perpendicular to an axis of said body, and
a shackle secured to said bottom portion by a bolt that passes through said oppositely disposed holes.

16. A coupler or connector body as set forth in claim 5, which includes:
two spaced coupler bodies each including an eye nut load bearing support, and
a rod supported by said spaced coupler bodies.

17. A coupler or connector body as set forth in claim 1, wherein each of said threaded bolts or screws have a concavely cupped end.

* * * * *